United States Patent [19]

Bergman et al.

[11] 3,996,968
[45] Dec. 14, 1976

[54] TUBING ARTICLES

[75] Inventors: Richard C. Bergman, Wilmington, Del.; Kenneth R. Williams, Landenberg, Pa.

[73] Assignee: E. I. Du Pont de Nemours and Company, Wilmington, Del.

[22] Filed: July 15, 1974

[21] Appl. No.: 488,827

Related U.S. Application Data

[63] Continuation of Ser. No. 326,058, Jan. 23, 1973, abandoned.

[52] U.S. Cl. .............................. 138/118; 138/128; 138/177
[51] Int. Cl.² ........................................ F16L 11/02
[58] Field of Search .......... 138/118, 128, 119, 177; 156/181

[56] References Cited

UNITED STATES PATENTS

| 31,614 | 3/1861 | Mayall | 138/128 |
|---|---|---|---|
| 1,989,427 | 1/1935 | Robey | 138/177 |
| 3,442,740 | 5/1969 | David | 156/181 |

Primary Examiner—Richard E. Aegerter
Assistant Examiner—L. Footland

[57] ABSTRACT

A tubing article is fabricated from a fluid permeable fibrous plexifilamentary polyolefin material having a porosity $\epsilon$ of 0.5 to 0.7, a contact angle of greater than 85°, and a Gurley-Hill porosity in the range of 4 to 70 sec/100 cc.

The tubing is particularly useful in sub-surface and trickle or drip type irrigation systems used in agriculture.

4 Claims, 3 Drawing Figures

TUBING ARTICLES

This is a continuation of application Ser. No. 326,058, filed Jan. 23, 1973, now abandoned.

BACKGROUND OF THE INVENTION

1. Field of the Invention

This invention relates to tubing articles, and particularly relates to tubing articles suitable for use in irrigation systems. More particularly, it relates to tubing articles fabricated of fibrous plexifilamentary polyolefin material, and still more particularly, it relates to fluid permeable tubing articles fabricated of non-woven spun bonded fibrous plexifilamentary polyolefin material suitable for use in subsurface and drip or trickle type irrigation systems.

2. Background of the Invention

Tubing articles for use in subsurface and drip or trickle irrigation systems are known in the agriculture art.

"The Farm Quarterly", January—February, 1971, pp. 30–34 reviews the progress and promise of subsurface and drip or trickle irrigation systems. Early forms of tubing used in such systems were low cost plastic tubing having tiny holes or orifices punched therein at one or two foot intervals. Later systems for subsurface and trickle irrigation employ complex emitters. Both systems have the disadvantage of being susceptible to clogging of the holes or emitters from the soil itself or soil organisms or from particulate matter present in the supply water, e.g., silt, algae, etc. Early experiments with long fibred porous plastic tubing, having thousands of tiny holes ranging in size from about one micron to well over five microns are mentioned.

British Pat. No. 1,290,847 discloses the use of porous fibrous conduit fabricated from woven or non-woven structures of natural, regenerated natural or synthetic fibers.

The fluid permeable tubing articles of the present invention are not subject to clogging due to soil or soil organisms or from particulate matter carried in the supply water. Further, the tubing articles of the invention have high tensile strength to support the internal water pressure required in subsurface and drip irrigation systems, and high seal strength where edges of the tubing article are bonded, e.g., by heat sealing. Additionally, the tubing articles have low cost and long service life under the soil as the plexifilamentary polyolefin material is not bio-degradable.

According to the present invention, there is provided a flexible fluid permeable tubing article formed of an non-woven plexifilamentary polyolefin material, said material characterized by having a porosity $\epsilon$ between 0.5 and 0.7, by having a contact angle greater than 85°, and a Gurley-Hill porosity in the range 4 to 70 sec/100 cc. The tubing is formed from two, like, superimposed, elongated members the lateral edges of which terminate in flat sealed projections.

The plexifilamentary sheet material from which the tubing articles of the present invention are formed is described in U.S. Pat. No. 3,442,740, which is incorporated by reference herein. Suitable plexifilamentary polyolefin sheet material may be prepared according to the teachings of the aforementioned patent from strands prepared from solid high molecular weight, fiber forming polymers. Hydrophobic polymers are especially preferred for their water repellant properties. Hydrophobic polymers may generally be considered to be those having the property of not being wetted by water. Polymers which may be used are found in the class of addition polymers. Among addition polymers, the polyhydrocarbons are preferred, and particularly linear polyethylene is preferred. Other suitable addition polymers are; e.g., blends of linear polyethylene and minor amounts of branched polyethylene, polypropylene, polybutene, polyisobutylene, polybutadiene and blends thereof.

The sheet material made from the above polymers is in the form of an integral network of primarily ribbon-like, fibrous elements whose cross sections vary along the length of the elements. This structure may be readily identified by tearing the sheet thereby exposing some fibrous elements, removing one or more of these fibrous elements and examining consecutive, transverse cross sections under a magnification of 450X. The filmy, ribbon-like elements have an average thickness below 4 microns.

Within the sheet structure, the polymeric material is arranged in overlapping and intersecting layers. The overlapping is apparent in the sheet structure from the fact that substantial amounts of fibrous elements are aligned in directions transverse to each other. This can be readily determined as by tearing the sheet. It will be noted that fibrous elements are exposed running in the direction which bridge the tear. The torn portion is then torn in a 90° transverse direction to the original tear. Fibrous elements are again noted which bridge the tear. These elements run in a transverse direction, thus establishing the overlapping and intersecting nature of the layers. If overlapping were not present, the fibrous elements would all appear to run generally in the same direction as they do in the as-spun plexifilamentary material described in Belgian Pat. 568,524.

One characteristic of the sheet material suitable for use in the tubing articles of this invention may be defined as the absence of parallel straight through holes or continuous tunnels in the sheet material. This characteristic is observable under magnification of 450x of the surface of the sheet. Under such observation it will be noted that there are discontinuous pockets or voids in the sheet material which randomly communicate by interconnecting tortuous paths with one another to provide the fluid permeable characteristic required for transmission of water at a controllable rate through the wall of a tubing article formed from the sheet material. Tortuosity in fibrous material is described in *Flow Of Gases In Porous Media*, Carman, Academic Press, New York (1956).

Suitable plexifilamentary polyolefin material in either sheet or strip form for use in fabricating the tubing articles of the invention is characterized by a porosity $\epsilon$ between 0.5 and 0.7, as defined by the ratio of free space or void volume to total volume of the material.

The plexifilamentary polyolefin sheet material from which the tubing articles of the invention are formed should not be readily wettable with water, e.g., the contact angle should be greater than 85°, as measured by the method described in *Surface Chemistry; Theory and Applications*, Bikerman, Academic Press, 2nd Ed., New York (1958).

The Gurley-Hill porosity of the plexifilamentary polyolefin material should be in the range of 4–70 sec/100 cc. and will preferably be in the range of 6–30 sec/100 cc. Gurley-Hill porosity, defined as the time required for 100 cc. of air to pass through 1 sq. in. of material at 1.25 psi, may be determined according to TAPPI Test Method T-460-M-49.

Suitable plexifilamentary polyolefin material for the tubing articles of this invention may have a basis weight between 1.3–3.5 oz./yd.$^2$ and a thickness between 4–12 mils.

The tubing articles of this invention may be formed by known methods of fabricating heat sealed tubing, e.g., the methods taught in U.S. Pat. No. 2,522,346 and U.S. Pat. No. 2,916,053.

In fact the first mentioned patent, a tube is formed by rolling up two plies of sheet material in a roll with convolutions of said plies separated by a sheet of non-heat sealable sheet material, the roll is sliced into narrower rolls, and heating the edges of the narrower rolls provides a heat seal between the longitudinal edges of the adjacent heat sealable sheets, while the non-heat sealable material between convolutions prevents a seal from being formed between convolutions of the heat sealable sheet material. The latter mentioned patent teaches a method of forming tubing by superposing layers of sheet material and drawing them over a plurality of heating elements disposed in spaced relationship to heat seal and slit the sheets into tubing of a desired diameter.

A preferred embodiment of the tubing article of the invention is illustrated in the attached drawings, in which.

Figure 1:
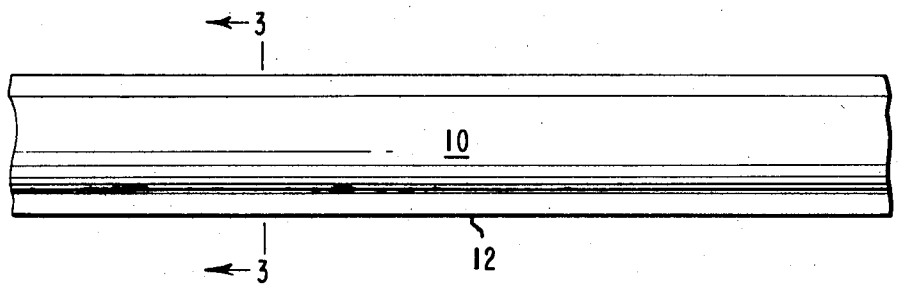
FIG. 1 is a top view of the tubing article according to the present invention.
Figure 2:
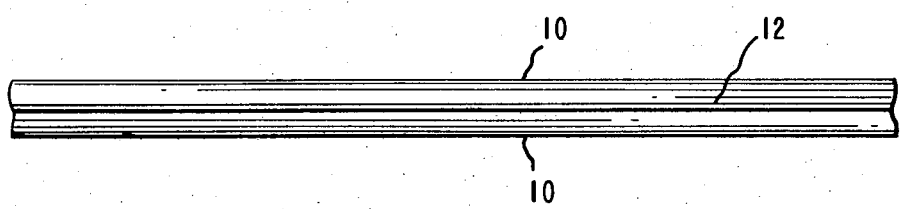
FIG. 2 is a side view of the tubing article according to the present invention.
Figure 3:
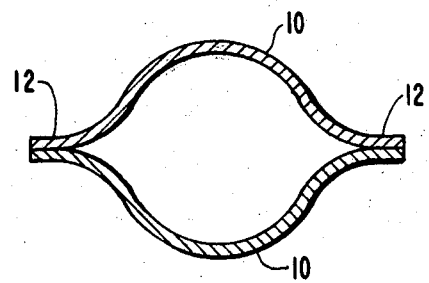
FIG. 3 is a sectional view taken along lines 3—3 of FIG. 1.

The tubing article formed of a non-woven plexifilamentary polyolefin material according to the invention comprises upper and lower wall sections 10 sealed together along their edges to provide flat, heat sealed projections 12. The tubing articles are preferably fabricated from flat sheets as described in aforementioned U.S. Pat. No. 2,522,346 and recited above. The resulting tubing article is in the form of a flat ribbon-like structure having upper and lower wall sections and heat seals along the edges of the sections. The flat ribbon-like structure readily expands to the shape illustrated in cross-section in FIG. 3 when it is filled with fluid, e.g., water at 2–5 pounds per square inch.

Additional qualities desirable in a tubing article for use in subsurface or trickle irrigation systems are high seal strength, long life and uniform flow. These qualities are required for the tubing articles to operate in an irrigation system having long lengths of tubing, e.g., 500 foot lengths in a dead ended system and 1000 foot lengths in a double ended irrigation system, and to provide uniform distribution of water to the soil over such lengths of tubing. High seal strength along the heat sealed bonds of the tubing is required to handle the pressure, e.g., 5–8 psi, used in irrigation systems where varying quantities of water are provided by varying the water pressure, and where differences in elevation over a field might require pressures greater than 2–3 psi to overcome gravitational effect on flow in the irrigation system. Further requirements are the rapid attainment of equilibrium flow over the length of the tubing to provide for uniform distribution of water to the soil, and to prevent excessive distribution of water to the soil from the sections of tubing closest to the water supply. It is also necessary that the tubing maintain these qualities over prolonged periods buried in the ground, and be able to withstand cycling of the irrigation system on and off.

Additional uses for the tubing articles for the distribution of fluids both gaseous and liquid will be readily apparent, e.g., soil aeration, application of fertilizers, aeration of fish ponds or sewage ponds and the separation of organic solvents from aqueous media.

The properties of the tubing articles are further illustrated in the following examples and comparative showing.

EXAMPLE I

A tubing article of the present invention was fabricated, with a nominal inside diameter of ⅝ in., according to the method of the aforementioned U.S. Pat. No. 2,522,346, from plexifilamentary polyethylene sheet material prepared according to the process of aforementioned U.S. Pat. No. 3,442,740. The sheet material has a basis weight of 1.6 oz./yd.$^2$, a nominal thickness of 5.5 mils, and a porosity $\epsilon$ of 0.6, a contact angle of 99°, and a Gurley-Hill porosity of 10 sec/100 cc. Measurement of the seal strength of the tubing article was made by determining the peel adhesion of the heat seal on each side of the tubing on an Instron Tester operating at 0.1 inch per min. One inch samples of tubing were cut and folded back so only the strength of one seal was measured. The seal strength of that seal was 16–18 lbs./in.

Flow studies were made on the tubing of this example by placing 4 ft. lengths of tubing inside slightly inclined glass tubes so that water permeating the tube walls could be collected and measured. Unfiltered city water (Wilmington, Delaware) was used and the initial flow at 2.5 psi was 3.6 qt./ft./day after 1 hour. Equilibrium flow of about 2.6 qt./ft./day was achieved within about 10 hours and maintained nominally at that rate for greater than 10,000 hours.

Accelerated life test of the tubing was determined at various pressures as shown in Table I using a 12 in. length of tubing. At 16 psi, the tube burst at 280 hours. Semi-longarithmic extrapolation of the data of Table I indicates a projected life of about 2,000–4,000 hours as a subsurface irrigation tube operating in a pressure range of 5 to 2 psi.

TABLE I

| PRESSURE (psi) | TIME TO RUPTURE (HOURS) |
|---|---|
| 26 | 42.5 |
| 18 | 190 |
| 16 | 280 |

EXAMPLE II

A tubing article was prepared and tested in the manner of Example I from a plexifilamentary polyethylene sheet having a basis weight of 2.2 oz./yd.$^2$, a nominal thickness of 7.5 mils, a porosity $\epsilon$ of 0.6, and a contact angle of 114°, and a Gurley-Hill porosity of 12 sec./100 cc. The seal strength of the tubing article determined by the peel adhesion test was 20–25 lb./in.

Flow studies were made in accordance with the procedure of Example I, and showed a nominal flow rate of 2 qt./ft./day at 2.5 psi with about 20 hours required to reach equilibrium flow. Accelerated life tests were conducted in the manner of Example I and are shown in Table II. The tube burst at 16 psi in 710 hours. Semi-longarithmic extrapolation of this data indicates a projected life of about 6,500–4,500 hours as a subsurface irrigation tube operating in a pressure range of 2 to 5 psi.

An ultraviolet exposure test was performed on this tubing to demonstrate its suitability for use in a trickle type irrigation system on the surface of the soil. The tubing was exposed to ultraviolet radiation using a Xenotester with quartz filter, and the seal strength was measured after 100 and 200 exposure hours using the peel adhesion test. The peel adhesion was initially 20.6 lb./in. After 100 hours exposure, the seal strength was 16.2 lb./in. and after 200 hours, the seal strength was 6.4 lb./in. The 100 hours exposure in the Xenotester is equivalent to four months in high UV exposure intensity regions of the world, e.g., Arizona in the summer, indicating that this tubing would have a useful life of at least one growing season in a trickle type irrigation system.

TABLE II

| PRESSURE (psi) | TIME TO RUPTURE (HOURS) |
| --- | --- |
| 49 | 18 |
| 40 | 54 |
| 36 | 86 |
| 31 | 160 |
| 26 | 361 |
| 22 | 430 |
| 16 | 710 |

SHOWING A

The irrigation tubing described in the aforementioned "Farm Quarterly" article of long-fibered porous plastic material was tested according to the methods set forth in Example I. The seal strength of this tubing determined by the peel adhesion test was 6–8 lb./in. The initial flow rate at 2 psi of this tubing article was in excess of 25 qts./ft./day, and the flow rate did not reach equilibrium of 3.5 qts./ft./day until about 200–300 hours. An accelerated life test shown in Table A resulted in the tube bursting at 2.5 hours at 16 psi. Semilogarithmic extrapolation of this data indicates a projected life of this tubing at less than 50 hours at 2 psi.

TABLE A

| PRESSURE (psi) | TIME TO RUPTURE |
| --- | --- |
| 16 | 2.5 |
| 12 | 6 |
| 10 | 10 |
| 8 | 12.3 |

The plexifilamentary polyolefin material of this tubing article had a contact angle of 54°. The material had thousands of straight-through holes from 10–15$\mu$ in diameter. The low contact angle, poor seal strength, short projected service life and prolonged time to reach equilibrium flow of this tubing appears to be related to treatment of the material by corona discharge and with anti-static agents, and makes it unsatisfactory for use in the aforementioned irrigation systems.

What is claimed is:
1. As a new article of manufacture, a flexible fluid permeable tubing, said tubing having walls formed from two, like, superimposed, elongated members the lateral edges of which terminate in flat sealed projections, each of said elongated members being formed throughout its length of plexifilamentary polyolefin material having a porosity $\epsilon$ between 0.5 and 0.7, a contact angle greater than 85°, and a Gurley-Hill porosity of 4 to 70 seconds per 100 cubic centimeters.
2. A tubing according to claim 1, wherein said plexifilamentary polyolefin material has a basis weight between 1.3 and 3.5 ounces per square yard and a thickness between 4 and 12 mils.
3. A tubing according to claim 1, wherein said plexifilamentary polyolefin material is polyethylene.
4. A tubing according to claim 3, wherein said plexifilamentary polyolefin material has a basis weight between 1.3 and 3.5 ounces per square yard and a thickness between 4 and 12 mils.

* * * * *